United States Patent
van den Nieuwelaar et al.

(10) Patent No.: US 7,029,387 B2
(45) Date of Patent: Apr. 18, 2006

(54) DEVICE AND METHOD FOR SEPARATING MEAT FROM BONE PARTS

(75) Inventors: Adrianus Josephes van den Nieuwelaar, Gemert (NL); Petrus Christianus Marius Janssen, Wilbertoord (NL); Maurice Eduardus Theodorus van Esbroeck, Bemmel (NL)

(73) Assignee: Stork PMT B.V., Boxmeer (NL)

( * ) Notice: Subject to any disclaimer, the term of this patent is extended or adjusted under 35 U.S.C. 154(b) by 0 days.

(21) Appl. No.: 10/381,684

(22) PCT Filed: Sep. 20, 2001

(86) PCT No.: PCT/NL01/00695

§ 371 (c)(1),
(2), (4) Date: Sep. 8, 2003

(87) PCT Pub. No.: WO02/26046

PCT Pub. Date: Apr. 4, 2002

(65) Prior Publication Data

US 2004/0033773 A1   Feb. 19, 2004

(30) Foreign Application Priority Data

Sep. 28, 2000   (NL) .................................. 1016290

(51) Int. Cl.
*A22C 17/00* (2006.01)

(52) U.S. Cl. ................................................ 452/135

(58) Field of Classification Search ......... 452/135–140
See application file for complete search history.

(56) References Cited

U.S. PATENT DOCUMENTS

| 4,025,985 | A |   | 5/1977 | Rousseau |
| 4,094,042 | A |   | 6/1978 | Rousseau |
| 4,137,605 | A | * | 2/1979 | van Rij et al. ............... 452/138 |
| 4,141,113 | A | * | 2/1979 | Van Bergen .................. 241/68 |
| 4,443,912 | A | * | 4/1984 | Ketels ......................... 452/138 |
| 4,535,504 | A | * | 8/1985 | Prosenbauer ................. 452/138 |

(Continued)

FOREIGN PATENT DOCUMENTS

AT   380 154 B   4/1986

(Continued)

OTHER PUBLICATIONS

Patent Cooperation Treaty Report Concerning Novelty Search of International Type issued in NL Application No. 1016290.

*Primary Examiner*—Thomas Price
(74) *Attorney, Agent, or Firm*—Kilpatrick Stockton LLP

(57) ABSTRACT

In a device, assembly and method for separating meat from bone parts, at least a chamber (2) is provided for receiving bone parts which are connected to meat, having a first open end (4) and a second open end (5) which is located opposite the first open end (4), a plunger (7), first displacement means for displacing the plunger (7) inside the chamber (2) from the first open end (4) thereof, and a stop element (13) at the second open end (5) for creating a closed space (3) together with the chamber (2) and the plunger (7). A pressure is applied to the bone parts by displacing the plunger (7) in the chamber (2). The stop element (13) is arranged at a distance from the chamber (2), so that at least one gap (15) is formed between the chamber (2) and the stop element (13), for the passage of meat which has been separated from the bone parts under the influence of pressure.

21 Claims, 15 Drawing Sheets

U.S. PATENT DOCUMENTS

| | | | |
|---|---|---|---|
| 4,536,920 A * | 8/1985 | Amersfoort | 241/24.16 |
| 4,538,324 A * | 9/1985 | Prosenbauer | 452/138 |
| 4,575,899 A * | 3/1986 | Prosenbauer | 452/138 |
| 4,649,600 A * | 3/1987 | Langen et al. | 452/138 |
| 4,685,626 A * | 8/1987 | Kerdiles et al. | 241/74 |
| 5,749,776 A * | 5/1998 | Evans | 452/138 |
| 6,132,304 A * | 10/2000 | Aarts et al. | 452/138 |
| 6,383,067 B1 * | 5/2002 | Kessel | 452/138 |

FOREIGN PATENT DOCUMENTS

| | | |
|---|---|---|
| DE | 29 01 909 A1 | 7/1980 |
| EP | 0 127 610 A1 | 12/1984 |
| GB | 2 016 258 A | 3/1979 |
| NL | C-1003692 | 1/1998 |
| WO | WO 98/04141 | 2/1998 |

* cited by examiner

DEVICE AND METHOD FOR SEPARATING MEAT FROM BONE PARTS

CROSS REFERENCE TO RELATED APPLICATIONS

This application claims priority to Netherlands Application No. 1,016,290 filed on Sep. 28, 2000 and is the United States national phase of International Application No. PCT/NL01/00695 filed on Sep. 20, 2001 and published in English as International Publication No. WO 02/26046 A1 on Apr. 4, 2002, the entire contents of which are incorporated herein by reference.

FIELD OF THE INVENTION

The present invention relates to a device for separating meat from bone parts, poultry, comprising at least a chamber for receiving meat which is connected to bone parts, having a first open end and a second open end which is located opposite the first open end, a plunger, first displacement means for displacing the plunger inside the chamber from the first open end thereof, and a stop element at the second open end for creating a space together with the chamber and the plunger.

When slaughtering and processing poultry, inter alia by-products in the form of bone parts remain. Often, there is still a residual quantity of meat on these bone parts, depending on the extent to which the meat has been removed from these bone parts in an earlier operation. It is worthwhile to recover the residual meat connected to the bone parts, firstly on account of the yield of the mass of meat obtained, and secondly because the remaining bones are cleaner and can be processed more successfully in a subsequent process, for example to form gelatine.

DISCUSSION OF THE PRIOR ART

U.S. Pat. No. 4,025,985 describes a device for removing meat from bone parts, which known device is provided with a hollow space which is intended to receive a quantity of bone parts connected to meat via a first open end thereof. At a second open end of the hollow space, the known device has a piston which can be displaced in the interior of the hollow space and which closes off the hollow space at its second end.

When the hollow space is filled with a quantity of bone parts connected to meat, hydraulic cylinders which are provided for this purpose can raise the hollow space, together with the piston, in order to couple the first end of the hollow space to an extrusion plate. As a result, a substantially closed space is formed between the first and second ends of the hollow space, in which the bone parts connected to meat are enclosed. Then, the closed space is reduced in size by displacing the piston, by means of hydraulic cylinders provided for this purpose, in the hollow space towards the first end of the hollow space, so that the bone parts connected to meat will be exposed to pressure. As a result, the meat which is connected to the bone parts will start to flow and will emerge from the hollow space to the outside via the perforations in the extrusion plate. The bone parts are retained by the extrusion plate.

A drawback of the known device is the use of an expensive and complex extrusion plate through which the meat can emerge to the outside from the hollow space. A further drawback of the known device is that the extrusion plate is difficult to clean.

A further drawback of the known device is that it comprises a large number of components, in particular a large number of pressure cylinders, which makes the known device very expensive and requires an extensive control system.

Yet another drawback of the known device is that the perforations in the extrusion plate are small in terms of the passage dimensions, with the result that considerable pressures are required in order to enable the meat to emerge from the hollow space. Also, as a result, the meat obtained using the device will become available in a fluid or semi-liquid state instead of as pieces of meat which are still recognizable to a consumer.

A further drawback of the known device is the occurrence of a cutting and/or scraping action of the perforations in the extrusion plate during the pressing operation. This can lead to considerably contamination of the extrusion plate by the meat residues, tendons and the like which are left behind. As a result, the perforations will clog up and the action of the known device will deteriorate considerably.

An additional drawback of the known device is that it is only suitable for use in a vertical arrangement.

SUMMARY OF THE INVENTION

It is an object of the invention to provide a device of the abovementioned type which completely or at least partially eliminates the abovementioned drawbacks.

To achieve the abovementioned object, the device is characterized in that the second end of the chamber and a first end of the stop element in a first position thereof, form at least one elongate gap. As a result, a relatively long gap can be obtained, the meat only having to cover a very short distance transversely with respect to the longitudinal direction of the gap. Moreover, the gap forms a relatively large opening, so that only relatively low pressures are required. Moreover, the gap does not have a cutting and/or scraping action, so that there will be no contamination with calcium.

In the first position of the stop element, while pressure is being applied to the bone parts which are connected to meat, the meat passes out of the chamber via the passage formed by the gap, the meat largely retaining its normal structure.

In a preferred embodiment of the device according to the invention, means for mechanically locking the stop element in its first position are provided, so that in the first position of the stop element the gap has very accurately defined dimensions.

In a preferred embodiment of the device according to the invention, the stop element can move into a second position, in which the stop element is situated at least partially in the chamber. By removing the plunger from the chamber and moving the stop element, in particular its first end, through the entire chamber, it is readily possible to remove remaining bone parts from the chamber. Moreover, in this way the gap is cleaned after each pressing action.

In an advantageous embodiment of the device according to the invention, the first end of the stop element has a periphery, the first end being provided, on the periphery, with cutting means for cutting off tendons which are connected to the bone parts. This makes it possible for meat which emerges and is still fixed to the bone parts in the chamber via tendons and the like to be cut free therefrom in a simple manner by moving the stop element towards its second position.

It is desirable to minimize the quantity of bone marrow which is present in the separated meat, since bone marrow has an adverse effect on the taste of the meat (iron or liver flavour) and also discolours the meat. In a further preferred embodiment of the device according to the invention, therefore, the stop element is provided in its interior with first, channel-like discharge means which extend from the first end of the stop element, and/or the chamber is provided in its interior with second, channel-like discharge means which extend substantially from the first open end of the chamber, the first and second discharge means being intended to discharge bone marrow which emerges from the bone parts under the influence of pressure. This completely or at least partially prevents there being any bone marrow in the separated meat.

In a preferred embodiment of the device according to the invention, the stop element is provided with at least one connection member which is connected to the first discharge means and is coupled to suction means for the purpose of improving the discharge of bone marrow to the environment. For the same reason, in a further preferred embodiment of the device according to the invention, the chamber is provided with at least one connection member which is connected to the second discharge means and is coupled to the abovementioned suction means.

In a preferred embodiment of the device according to the invention, the gap between the chamber and the stop element, in the first position of the stop element, has a fixed width as seen in the longitudinal direction of the gap, with the result that meat residues obtained using the device have a very good structure and also that it is possible to ensure a constant composition of the meat residues.

In a further preferred embodiment of the device according to the invention, the gap between the chamber and the stop element, in the first position of the stop element, has a variable width as seen in the longitudinal direction of the gap, so that the gap width can be locally matched to the dimensions of the bones in the chamber. In particular, the gap width may be greater where there are no bones of very small dimensions, so that there is no risk of the meat being contaminated with very small pieces of bone.

In a further advantageous embodiment of the device according to the invention, the plunger has a stop face which can be turned towards the bone parts and has a contour which is matched to the contour of the bone parts. As a result, it is possible to supply the bone parts to the chamber in a defined position, so that the bone parts can be exposed to a targeted pressure, and also it is easier to allow the bone marrow to emerge from the chamber via the second discharge means.

In a further advantageous embodiment of the device according to the invention, the plunger is provided with cutting means for executing a cutting action on the bone parts with meat attached, inside and/or outside the chamber. As a result, it will be easier to remove the meat from the bones, and/or a lower pressure will be sufficient during the application of pressure to the bone parts with meat attached. In particular, the device is provided with means for carrying out a preliminary treatment on the bone parts with meat attached. Consideration may be given, for example, to the pre-positioning of the bone parts with meat attached with respect to the chamber, and in particular consideration may be given to the prior removal of, for example, skin, bone parts which contain a relatively large amount of bone marrow or, for example, innards and/or organs which adhere to the bone parts with meat attached. Carrying out a preliminary treatment, for example the removal of skin, has the purpose of having a positive effect on the composition of the mass of meat ultimately obtained and/or of improving separation.

In an advantageous embodiment of the device according to the invention, the stop element is provided, at its first end, with a layer of flexible covering material, the thickness of which may vary locally. As a result, it is possible to match the local spring characteristic of the first end of the stop element to the bone parts which are to be exposed to pressure, so that the compressive forces exerted on the bone parts can be targeted and an improved distribution of forces is achieved, and also slight variations in size of the bone parts to be processed can be dealt with.

In a preferred embodiment of the device according to the invention, control means are provided, which are designed to control the displacement of the plunger in the chamber, the displacement of the plunger in the chamber being controlled on the basis of the location of the plunger in the chamber, and/or on the basis of the velocity of the plunger in the chamber and/or on the basis of the time which has elapsed during the displacement.

Advantageously, one or more devices according to the invention form an assembly for processing slaughtered animals or parts thereof, the devices according to the invention being arranged on one or more movably driven supports. The result is a device which is eminently suitable to interact in line with a conveyor along which slaughtered animals or parts thereof are moved.

Advantageously, the assembly is designed to interact synchronously with a conveyor for moving slaughtered birds along the device.

In a further preferred embodiment of the assembly according to the invention, supply means are provided, at least comprising a reservoir and a hopper which opens out in the vicinity of the first open end of the chamber, for at least partially supplying the bone parts with meat attached to the interior of the chamber. As a result, the assembly can also be used for processing bone parts with meat attached, such as necks and the like, in batches.

In practice, there is a risk of the recovered meat being contaminated with bone marrow and/or blood, which results in a liver-like flavour and a red discoloration of the meat residues. In an advantageous embodiment of the device and the assembly according to the invention, cleaning means are provided for removing blood and/or bone-marrow contamination from meat which has been separated from bone parts connected to meat, using a treatment liquid. Washing the meat enables the contamination with bone marrow and/or blood to be removed.

In a further advantageous embodiment of the device and assembly according to the invention, a drying device is provided for removing excess treatment liquid which adheres to the meat which has been separated off.

In a further preferred embodiment of the device and the assembly according to the invention, a rotatably driven drum is provided, which interacts with the drying device and is provided with a perforated wall.

The present invention also relates to a method for separating meat from bones parts, comprising the steps of supplying meat which is connected to bone parts to a space, applying pressure to the bone parts by reducing the size of the space, and discharging meat which has been separated off out of the space via a gap.

In an advantageous variant of the method according to the invention, a preliminary treatment is carried out on the bone parts with meat attached, inside and/or outside the space. The preliminary treatment advantageously comprises making incisions in the bone parts with meat attached, so that the separation of meat takes place more easily.

Another possible preliminary treatment is, for example, the pre-positioning of the bone parts with meat attached with respect to the said space. The pre-positioning of the bone parts with meat attached may in this case take place in such a manner that the height at which the bone parts with meat attached are supplied to the said space can be adjusted as desired. The pre-positioning may also involve the bone parts with meat attached being introduced into the said space in such a manner that the meat which is to be separated is situated as close as possible to the gap and therefore has to cover the shortest possible distance within the said space.

It should be noted that a device for separating meat from bone parts by applying pressure to bone parts connected to meat is also known, for example, from NL-C-1003692.

The device which is known from NL-C-1003692 comprises a filter chamber which is open at a first end and is intended to receive bone parts connected with meat in batches. The walls of the filter chamber are provided with a perforation. Furthermore, the device is provided with a plunger which can move inside the filter chamber and, together with the filter chamber, can form a substantially closed space. By displacing the plunger in the filter chamber from the open side in such a manner that the closed space is reduced in size, the pressure in the filter chamber will increase and the meat will emerge to the outside through the perforation in the filter chamber under the influence of pressure, with the bone parts remaining behind in the filter chamber.

The above and further aspects, characteristics and advantages of the present invention will be explained in more detail with reference to the following description of preferred embodiments of a device and method according to the invention and with reference to the drawing, in which identical reference numerals denote identical or similar components and in which:

DESCRIPTION OF THE PREFERRED EMBODIMENTS

Figure 1:
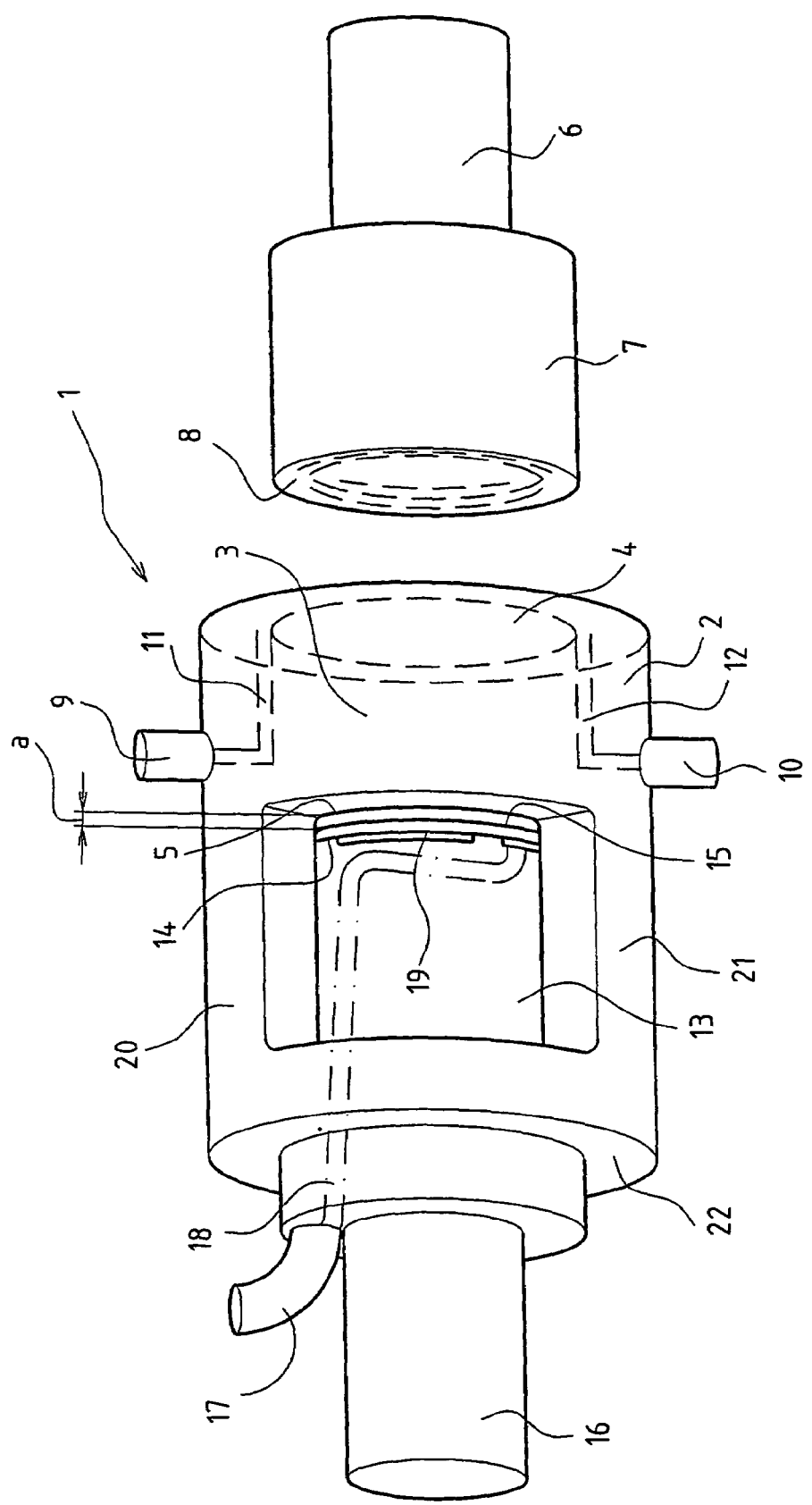
FIG. 1 shows a perspective view of a device according to the invention.

FIG. 1 shows a device 1 for separating meat from bone parts according to the present invention. The device 1 comprises a chamber 2 with a substantially circular contour which is intended to receive bone parts which are connected to meat in its interior 3. The chamber 2 has a first open end 4 and a second open end 5 which lies opposite the first open end 4. At the first end 4, the device 1 comprises a rod 6 which is connected to first displacement means (not shown in more detail). The first displacement means may, for example, comprise a pneumatic or hydraulic cylinder or an electro-mechanical actuator, but are preferably formed by mechanical displacement means, such as for example a system of rods which can be actuated by a cam track. At one end, the rod 6 is provided with a cylindrical plunger 7, the diameter of which is matched to the dimensions of the chamber 2, so that the plunger 7 can be moved by the rod 6 into the interior 3 of the chamber 2 from the first open end 4 by means of the first displacement means. The plunger 7 has a stop face 8 which, by way of example, has a substantially concave surface, but may also be of any desired contour which matches the shape of a product to be processed.

On its outer circumference, the chamber 2 is provided with two connection members 9, 10 which are located substantially diametrically opposite one another and are connected to a first channel system 11 and a second channel system 12, respectively, intended to discharge bone marrow. The connection members 9, 10 are intended to be coupled to suction means (not shown in more detail), for example a channel with a vacuum pump or the like. The channel systems 11, 12 lie substantially diametrically opposite one another and are arranged on the inner circumference of the chamber 2, specifically at those locations of the inner circumference of the chamber 2 where, during use of the device 1, it is expected that bone marrow will be released. The channel systems 11, 12 partially extend along the inner circumference of the chamber 2, in the axial direction thereof, from the first open end 4, and in the vicinity of the second open end 5 they extend through the wall of the chamber 2. This is diagrammatically indicated by dashed lines in the figure.

Figure 4:
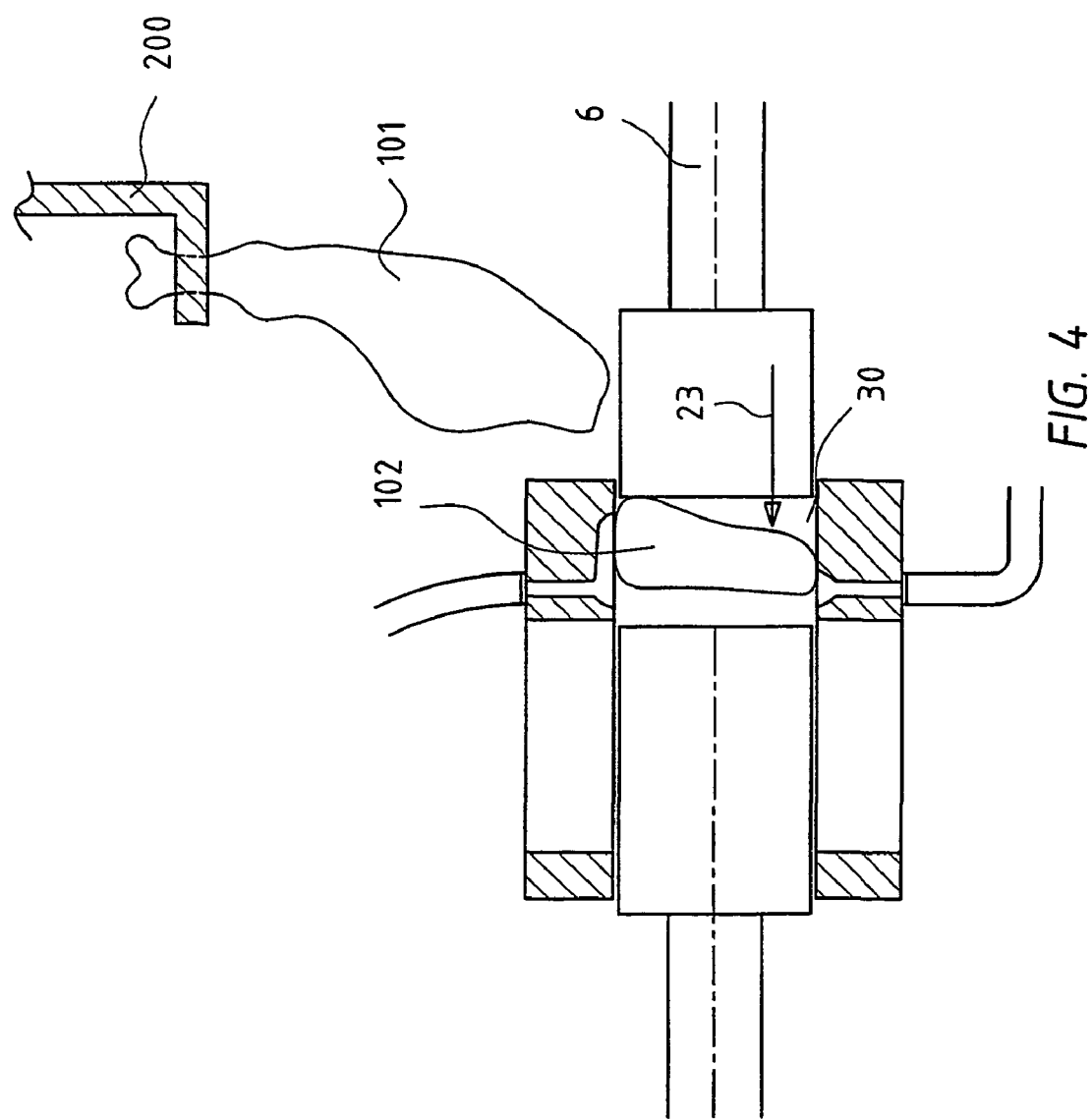
FIG. 4 shows a diagrammatic cross-sectional view through the device according to the invention at the start of the pressing process.

At the second open end 5 of the chamber 2, a cylindrical stop element 13 is provided at a distance from the chamber 2, with a first, substantially flat end 14. The stop element 13 has a diameter which substantially corresponds to the internal diameter of the chamber 2. Together with the chamber 2 and the plunger 7, the stop element 13 can form a substantially closed pressure space 30 (FIG. 4). Between the first end 14 and the chamber 2 there is a gap 15 with a gap width a. In the embodiment of the device 1 which is shown, the gap width has constant dimensions over the entire length of the gap 15. However, it is also possible for the gap 15 to create a gap width which varies over its length as a function of the geometry and/or composition of the bone parts to be processed, in which case, for example in the area where no small bone parts are expected during use of the device, it is possible to use a larger gap width. This is not shown in more detail.

At a second end 16, the stop element 13 is connected to second displacement means (not shown in more detail) which are intended to displace the stop element 13 in the axial direction of the chamber 2. The second displacement means may, like the first displacement means, comprise a pneumatic or hydraulic cylinder or an electromechanical actuator, but are preferably formed by mechanical displacement means, such as for example a system of rods which can be actuated by a cam track.

The stop element 13 is provided, in the vicinity of the second end 16, with a connection member 17 which is intended to be coupled to suction means (not shown in more detail), for example a channel with a vacuum pump or the like. The connection member 17 is connected, via a channel system 18 arranged in the stop element 13, to gap-like openings 19 which are formed in the vicinity of the first end 14 on the outer circumference of the stop element 13 and are intended to discharge bone marrow. This is diagrammatically indicated by dot-dashed lines in the figure.

A support member 22 is arranged at the second open end 5 of the chamber 2 via two connecting parts 20, 21 which lie diametrically opposite one another. In the embodiment of the device 1 which is illustrated, the support member 22 is in the form of a ring with an internal diameter which corresponds to the external diameter of the stop element 13, so that the stop element 13 is radially surrounded by the support member 22. In the axial direction of the chamber 2, the connecting parts 20, 21 have a cross section which is in the form of a segment of a ring. As a result, the connecting parts 20, 21, by means of the sides which face towards one another, describe a circle with a diameter which corresponds to the external diameter of the stop element 13, so that stop element 13 closely adjoins the connecting parts 20, 21. The design of the chamber 2 is illustrated in more detail and discussed with reference to FIG. 2.

Figure 2:
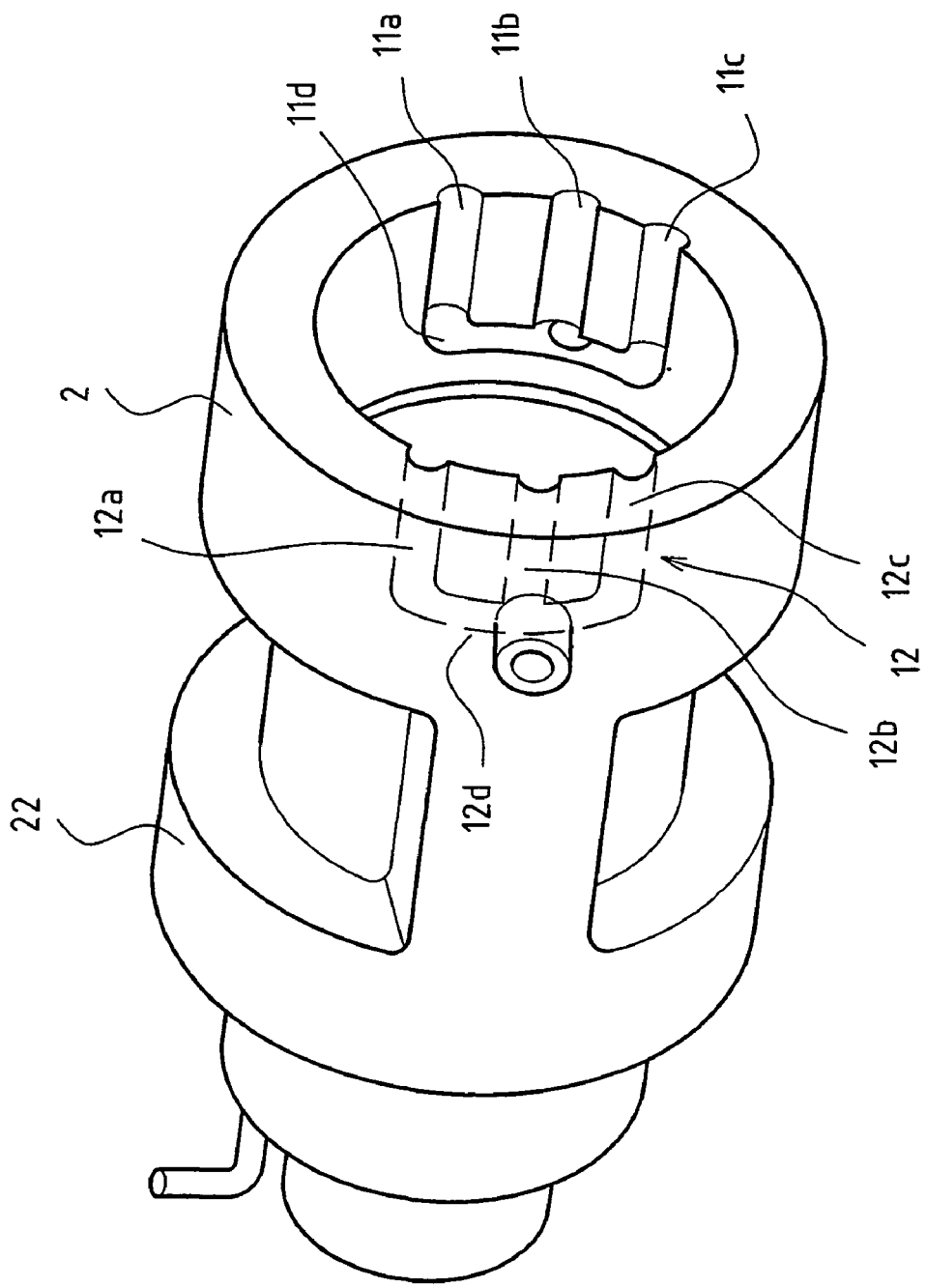
FIG. 2 shows a perspective view of a part of a device according to the invention.

FIG. 2 shows the chamber 2 with the support member 22 coupled to it in an orientation which is altered with respect to FIG. 1 and in which the location of the channel systems 11, 12 is clearly apparent. In the preferred embodiment of the chamber 2, which is illustrated, the channel systems 11, 12 each comprise three channels 11a, 11b, 11c and 12a, 12b, 12c, respectively, which extend in the longitudinal direction of the chamber 2 and are substantially parallel, the channels 11a, 11b, 11c and 12a, 12b, 12c being connected by a channel 11d or 12d, respectively, which extends in the tangential direction of the chamber 2. The channels 11d, 12d are in this case connected to the connection member 9 and the connection member 10 (not shown in more detail). As is the case with regard to the location where the channels 11a–12c are arranged on the inner circumference of the chamber 2, the path of the channels 11a–12c may be matched to the locations where, when the device according to the invention is being used, it is expected that bone marrow will be released. Moreover, the number of channels and/or channel systems is not restricted to the number shown.

The operation of the device according to the present invention will now be explained with reference to FIGS. 3–8.

Figure 3:
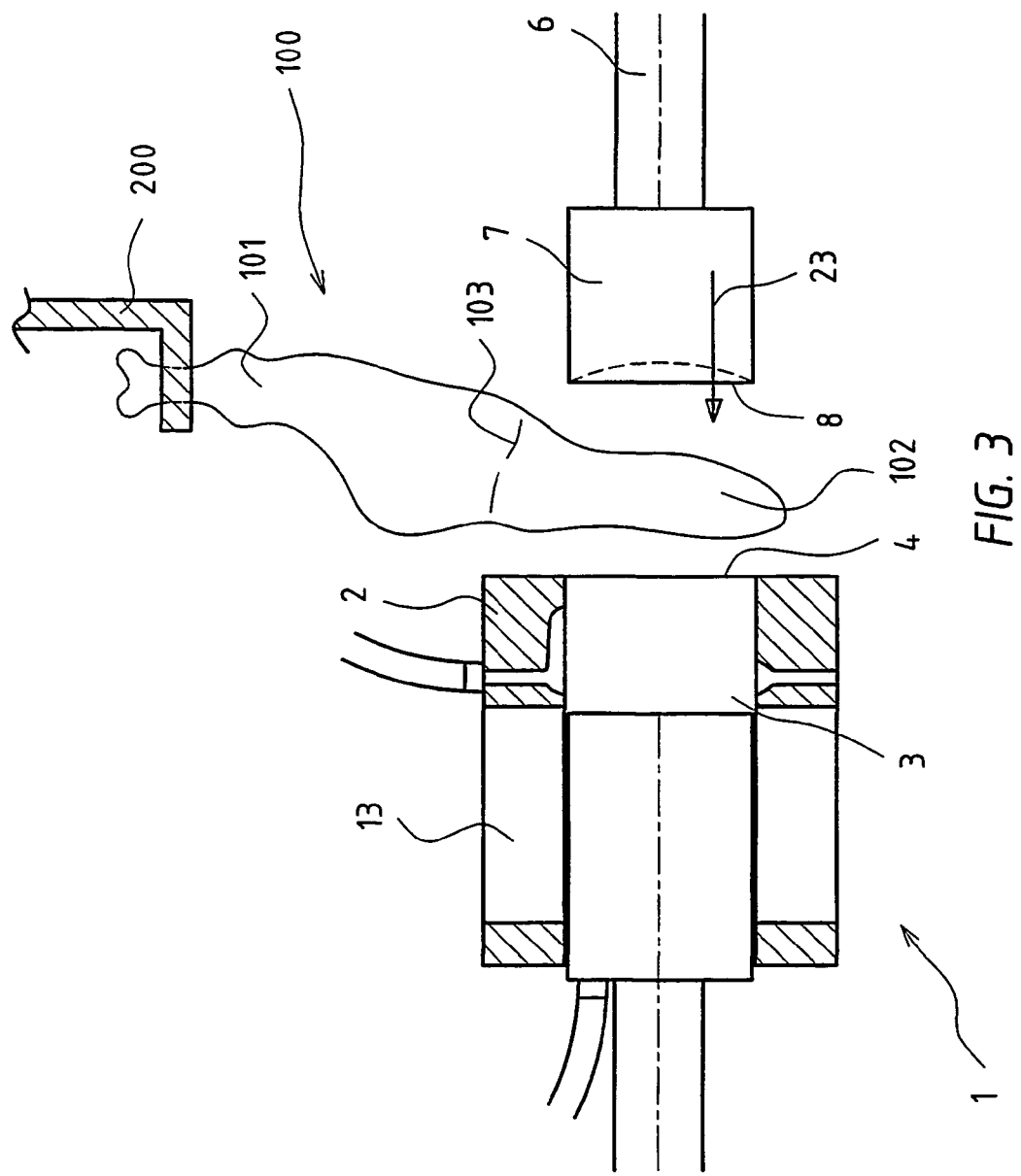
FIG. 3 shows a diagrammatic cross-sectional view through the device according to the invention in a starting position thereof.

To start with, the device 1 is in the starting position illustrated in FIG. 3, in which a slaughtered bird or a part thereof, which is denoted overall by the reference numeral 100, is situated in front of the first open end 4 of the chamber 2. The slaughtered bird 100 or part thereof, in the present case a leg 101 with an attached chine 102, is suspended from a product carrier 200, which is very diagrammatically indicated, the product carrier 200 forming part, for example, of a collection of product carriers which are connected to one another by a driven chain and which are advanced using a conveyor (not shown in more detail).

The meat has already been removed from the chine 102, i.e. meat which is easy to remove has already been taken off the chine 102 by means of a mechanical meat-removal device or by hand. However, the chine 102 may also have undergone another preliminary treatment, such as for example skinning, the removal of attached innards or organs, or the removal of bone parts which contain a large amount of bone marrow. However, a certain quantity of meat is still attached to the chine 102, and this meat is worth recovering using the device according to the invention, firstly because of the mass of meat obtained in this way, and secondly because the bones which remain are cleaner and can be processed better in a subsequent process, for example to form gelatine.

The chine 102 is pressed into the interior 3 of the chamber 2 by moving the rod 6 out of the starting position illustrated in FIG. 3 in a direction indicated by arrow 23 by means of the first displacement means (not shown in more detail). The chine 102 will be separated from the leg 101 substantially at the level of a diagrammatically indicated line 103 by means of a cutting action of the stop face 8 and the circumferential edge of the first open end 4 of the chamber 2 when the plunger 7 is forced into the interior 3 of the chamber 2 via the first open end 4, after which, as soon as the plunger 7 has passed the first open end 4, pressure is built up in the pressure space 30 formed between stop element 13, the chamber 2 and the plunger 7. This is illustrated in FIG. 4.

Figure 5:
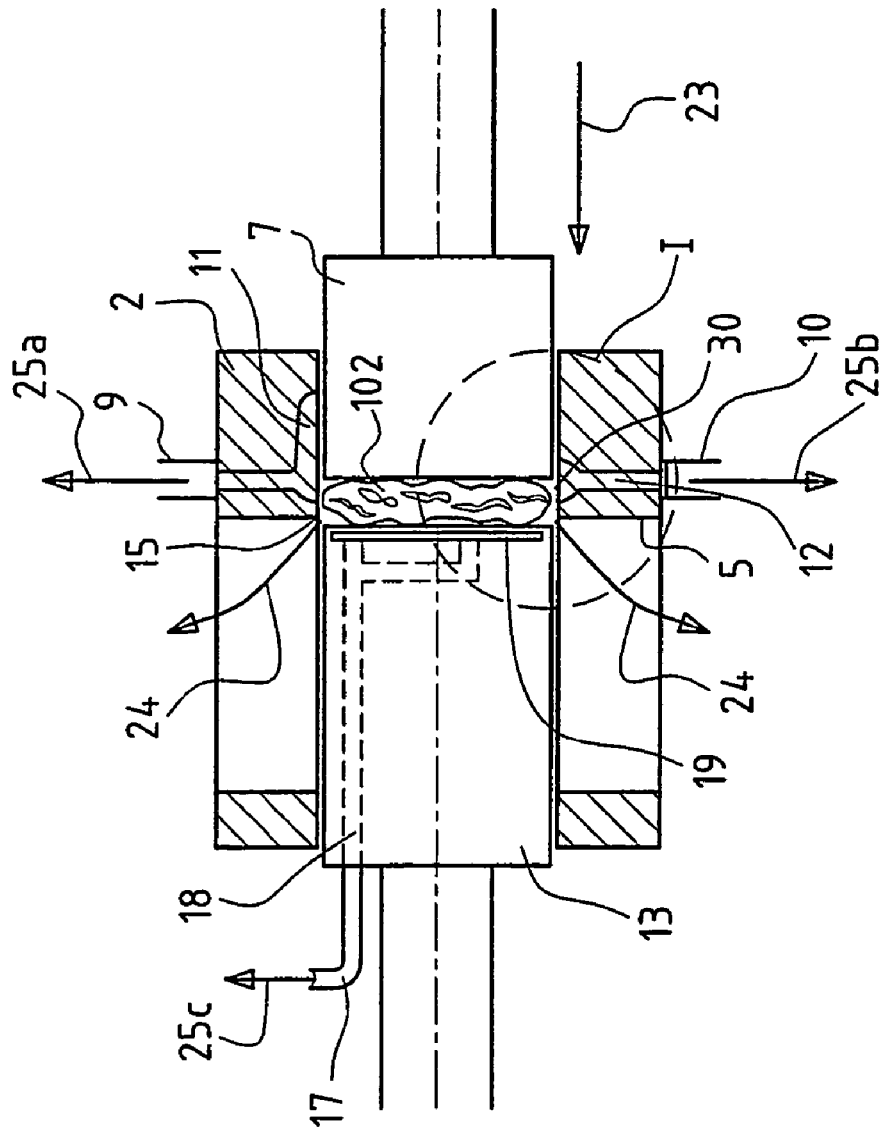
FIG. 5 shows a diagrammatic cross-sectional view through the device according to the invention during the pressing process.

It can be seen from FIG. 4 that the chine 102 is situated entirely in the pressure space 30 and has been separated from the leg 101 which is still suspended from the product carrier 200. The rod 6 is moved onward by the first displacement means in the direction indicated by the arrow 23, with the result that the pressure space 30 is reduced in size, the pressure therein will increase and, consequently, the chine 102 will be subject to pressure. This situation is illustrated in FIG. 5, in which the chine 102 is situated in the pressure space 30, the size of which has been considerably reduced.

As a result of the reduction in size of the pressure space 30 by means of the displacement of the plunger 7 in the direction of arrow 23, the pressure which prevails in the pressure space 30 will, as indicated above, increase. On account of this increased pressure, a certain flowing of the bones in the chine 102 and the meat residues adhering thereto occurs, and the meat residues are removed from the bones as a result of the friction between the bones in the chine 102. In the case of poultry, the separation of meat and bone parts takes place substantially through displacement and running of meat. As has already been indicated above, the stop element 13 is situated at a certain distance from the second open end 5 of the chamber 2, with the result that a gap 15 has formed between the chamber 2 and the first end 14 of the stop element 13. The meat which is displaced under the influence of pressure will emerge to the outside from the pressure space 30 via the gap 15, as indicated by arrow 24. The meat can only leave the pressure space 30 via the gap 15, since the plunger 7 has a very close fit with respect to the internal diameter of the chamber 2. During the pressing action, the gap 15 preferably has a fixed dimension, which in the context of the present invention means that during the pressing action the stop element 13 is held at a fixed position with respect to the chamber 2. The gap width is preferably smaller than the dimensions of the smallest bone parts which are present in the chine. In practice, the dimensions of the smallest bone parts will be less than approximately 1 mm, so that the gap width is preferably less than 0.7 mm. In particular, the gap width is less than 0.5 mm. The result is a high degree of bone separation, and small residual pieces of bone are prevented from reaching the end product, since these pieces of bone would have to be removed again from the product at a subsequent stage. The stop element 13 has to be held at a fixed position with a very high degree of accuracy during the pressing action. Even very slight deviations in the gap width may lead to an undesirable content of small pieces of bone in the meat and may lead to a deterioration in the operation of the device. Therefore, it is advantageous for the device 1 to be provided with a mechanical lock (not shown in more detail), which prevents the stop element 13 from being pressed away from the chamber 2 during the pressing action. Consequently, the gap width cannot change during the pressing action.

It should be noted that the length of the gap 15 in the circumferential direction of the stop element 13 covers a considerable part of this element. Therefore, the gap 15 has a relatively great length, with the result that, partly in combination with a very small width of the gap 15, the meat residues obtained using the device 1 have a very good structure and, moreover, are available as pieces of meat which are recognizable to a consumer. In addition, the gap 15 has a very defined contour and very defined dimensions, resulting in a readily manageable process.

Furthermore, it should be noted that it is also possible for the dimensions of the gap 15 to vary over the course of time during the pressing action. In this way, the output of the device according to the invention and/or the structure of the meat residues can be adapted to the pressure process in the chamber 2.

Bones of poultry are relatively soft, and consequently bone marrow which is present in the bones will flow out of the pressure space together with the meat residues under the influence of the increased pressure. Since bone marrow has an adverse affect on the flavour of the meat (iron/liver taste) and discolours the meat, it is desirable to minimize the quantity of bone marrow present in the meat residues. In the device according to the invention, this is achieved by separating the bone marrow which emerges from the meat residues by sucking the bone marrow out via the channel systems 11, 12 and 18.

As described in FIG. 1, the chamber 2 is provided, on its outer circumference, with two connection members 9, 10, which are connected to the first channel system 11 and the second channel system 12, respectively, and the stop element 13 comprises a connection member 17 which is connected to the channel system 18 arranged in the stop element 13, the channel systems 11, 12 and 18 being intended to discharge bone marrow which emerges from the bones. The connection members 9, 10 and 17 are in this case coupled to suction means (not shown in more detail), for example a channel with a vacuum pump or the like. As a result, a vacuum is formed in that section of the channel systems 11, 12 which lies on the inner circumference of the chamber 2 and at the gap-like openings 19, as a result of which the bone marrow which emerges from the bones is sucked out and is discharged in a direction indicated by arrows 25a, 25b and 25c. The discharge of bone marrow emerging from the bones is illustrated in more detail in FIG. 6, in which an area which is denoted by I is shown on an enlarged scale.

Figure 6:
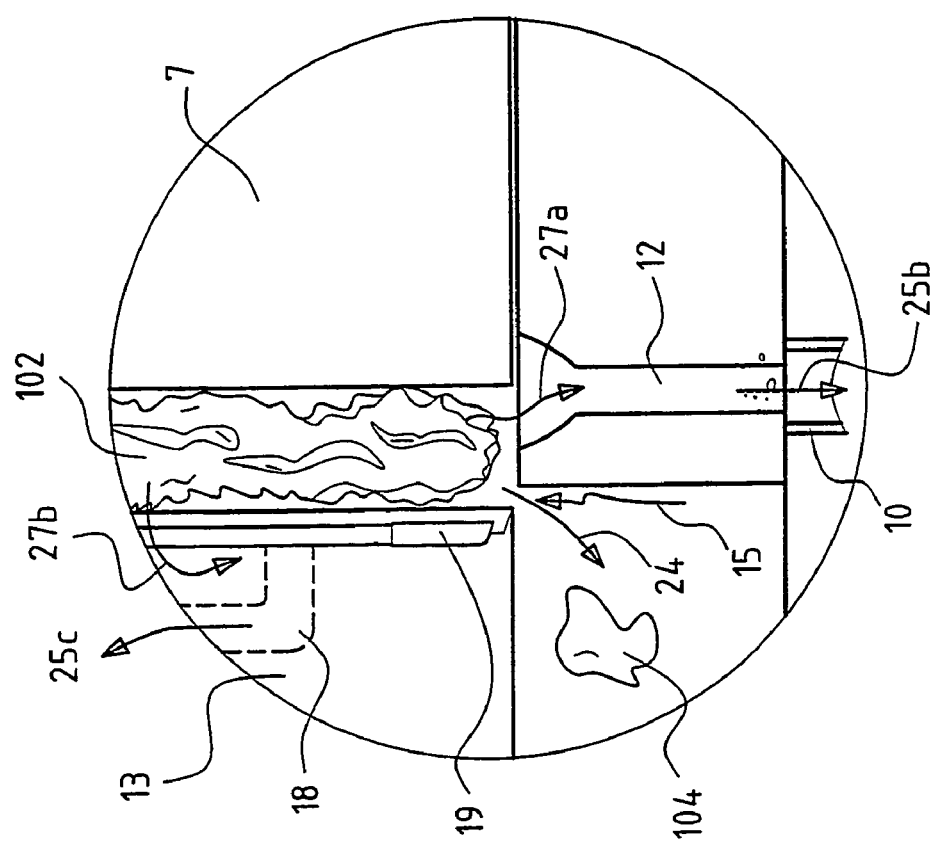
FIG. 6 shows, on an enlarged scale, a detail I from FIG. 5.

FIG. 6 shows the area which is denoted by I in FIG. 5, in which the chine 102, which is exposed to pressure, is situated between the stop element 13 and the plunger 7. Meat 104, which is diagrammatically illustrated, is emerging from the pressure space 30 via the gap 15 in the direction indicated by arrow 24. As a result of the sucking action of the suction means (not shown in more detail), the bone marrow, which is less viscous than the meat 104, will be sucked out via the channel systems 12, 18 in a direction indicated by arrows 27a and 27b, respectively, and through the channel systems 12, 18 in the direction of arrows 25b, 25c.

The pressing action which involves the plunger 7 being moved into the interior of the chamber 2, can be controlled in a number of ways, in each case separately or in combination with one another.

Firstly, the pressing action can be controlled on the basis of the pressure prevailing in the interior of the chamber 2. During the pressing action, the pressure in the chamber 2 has an effect on the operation of the device according to the invention. The greater the pressure, the more meat it will be possible to obtain. However, an excessively high pressure will have an adverse effect on the structure of the meat and, moreover, an increase in pressure will lead to a higher bone-marrow content in the meat.

The second possibility is for the pressing action to be controlled on the basis of distance, i.e. for the distance between the stop surface 8 of the plunger 7 and the end 14 of the stop element 13 to be controlled, for example as a function of the degree of filling of the pressure space 30 and/or the type of product, in such a manner that there is at least a minimum space between the stop surface 8 and the end 14 at the end of the pressing action. This prevents the bones of a product, for example a chine, from being broken during the pressing action, which would cause additional bone marrow to escape and would lead to the formation of bone splinters which could be entrained by the emerging meat.

Finally, control on the basis of the speed at which the plunger 7 moves in the interior of the chamber 2 during the pressing action is possible. If the speed of movement of the plunger 7 during the application of pressure to the bone parts connected to meat is too high, the result will be a reduced yield. The reason for this is that the high speed of movement means that the meat has less time to flow outwards and will more or less behave as an incompressible medium. Moreover, an excessively high speed of movement leads to a deterioration in the interplay of forces and an excessively high speed also results in a deterioration in the structure of the meat. If the speed of movement of the plunger 7 is too low, the meat obtained will contain a relatively greater proportion of bone marrow.

In this context, it should be noted that it is not necessary for the plunger 7 to be moved with the same degree of speed and force during every stage of the pressing action. When the pressing action commences, where scarcely any pressure needs to be built up but where it is important for the bone part connected to meat which is to be processed to be rapidly separated from a slaughtered bird, the movement of the plunger 7 can be controlled, for example, by means of a rod actuated by a cam track. At the end of the pressing action, a considerable force has to be transmitted over a short distance, and consequently this part of the movement of the plunger 7 should preferably be made with the aid of means which are able to transmit a considerable force in combination with a very high positioning or displacement accuracy. This can be achieved, for example, with a geared transmission.

The operation of the device according to the invention can be improved further by providing the stop surface 8 and/or the end 14 with a layer of slightly compressible material, for example of a suitable plastic. In particular, a layer of this type is provided with a profiling which is matched to the contour of the product to be processed, so that the application of pressure to the product can be achieved in a more targeted fashion. In this case, the profiling is preferably applied in such a manner that the meat, during its movement which takes place while pressure is being applied to the product, is supported in such a manner that it is easier for the meat to be forced outwards. Moreover, this makes it possible to prevent the larger bones in the bone parts connected to the meat from being broken and/or closing off the gap 15.

The prevention of breaking of the bones can be further assisted by adapting the spring characteristic of the compressible material at the locations where the larger bones are situated during the pressing action.

Furthermore, the action of the device according to the invention can be improved still further by, at the start of the pressing action, making controlled cuts in the meat connected to bone parts by means of cutting means, for example blades or the like, arranged at suitable locations on the stop surface 8 and/or the end 14. As a result, it will be easier for the meat to flow out of the pressure space 30 while pressure is being applied to it.

The position of the device which is shown in the figure is maintained for a certain period of time. After this time has elapsed, the plunger 7 is retracted from the chamber 2 and the pressure in the pressure space 30 will decrease. This is shown in FIG. 7.

At the end of the pressing action, the rod 6 with the plunger 7 is retracted from the chamber 8 in a direction indicated by arrow 28. Then, the stop element 13 is likewise displaced, by the second displacement means (not shown in more detail), in the direction of arrow 28 substantially until it reaches the first open end 4 of the chamber 2. During this movement, the planar first end 14 of the stop element 13 together with the remainder of the chine 102 resting against it moves past the second open end 5 of the chamber 2.

In practice, it may be the case that the separated meat residues 104 are still joined to the chine 102 via tendons. As a result of the fit of the stop element 13 in the chamber 2, when the end 14 moves past the second open end 5 of the chamber 2, a cutting effect will occur between them and the tendons which are present between the meat residues 104 and the chine 102 will be cut through. To enhance the cutting effect which arises between the chamber 2 and the end 14, the chamber 2 may be provided with a sharp edge at the second open end 5, or the end 14 of the stop element 13 may be provided with a cutting edge.

Figure 7:
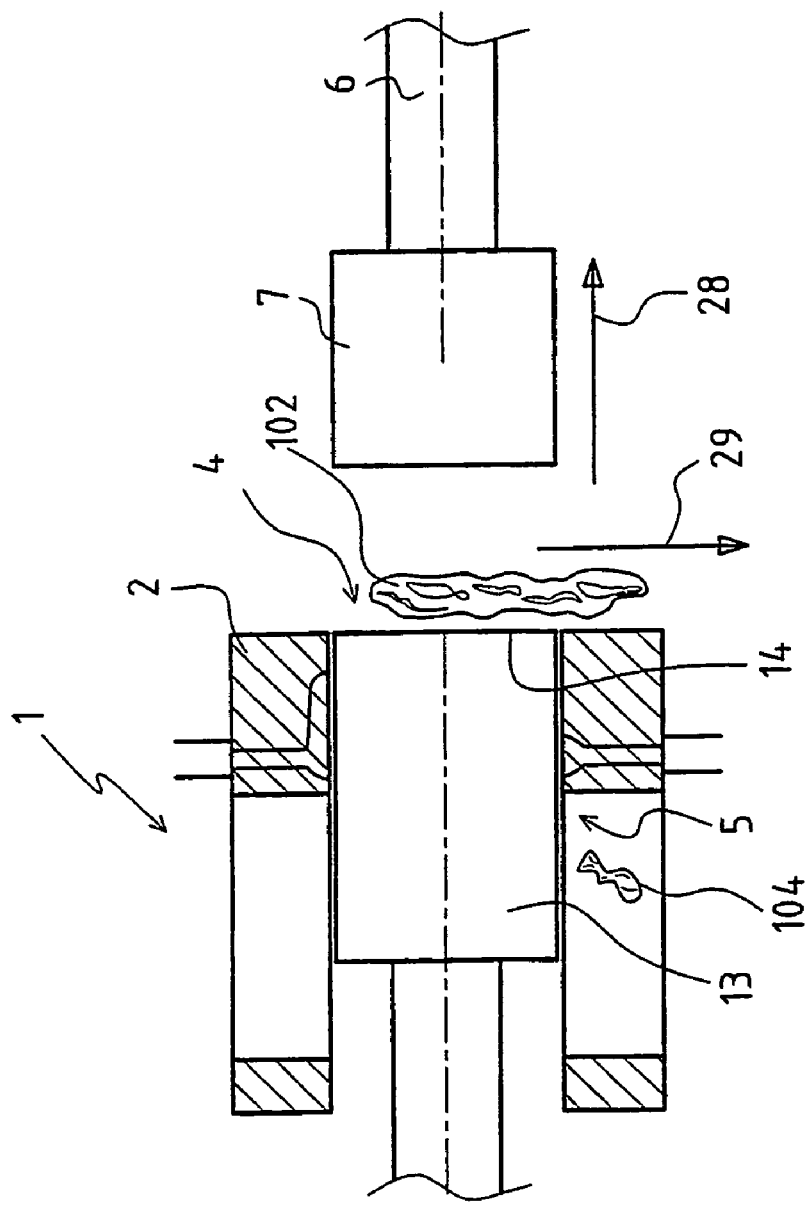
FIG. 7 shows a diagrammatic cross-sectional view through the device according to the invention at the end of the pressing process.

When the stop element 13 has been moved all the way into the position shown in FIG. 7, the chine 102, from which meat has been removed, drops out of the device 1 under the force of gravity, as indicated by the arrow 29. It is also possible to use scraper means, by which the chine 102 from which meat has been removed can be scraped off the stop element 13, so that it is possible to prevent residues from remaining on the end 14.

Partly because of its compact structure, the device according to the invention is eminently suitable for incorporation in a device in which a plurality of devices according to the invention are combined to form an assembled device for separating meat from bone parts. This is shown in FIG. 8.

Figure 8:
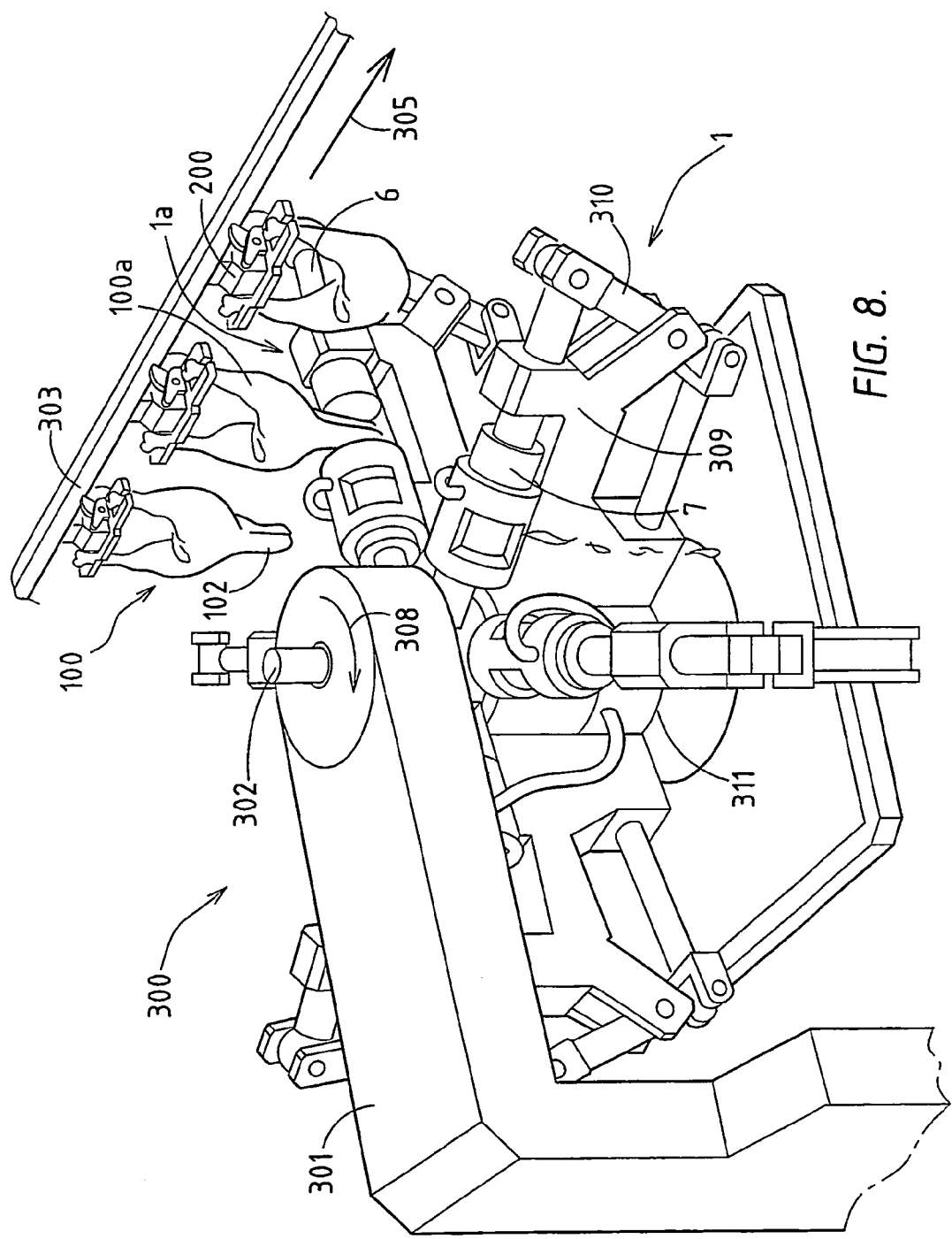
FIG. 8 shows a perspective view of an assembly of devices according to the invention.

FIG. 8 shows a device 300 in which a plurality of devices 1 according to the invention are arranged on a carrier 311 in a star-shaped pattern, the carrier 311 being mounted in a frame 301. The device 300 is in this case moveable about, for example, a shaft 302 which lies substantially in a vertical plane, in a direction indicated by arrow 308. The device 300 interacts in line with diagrammatically illustrated conveyor 303, along which product carriers 200 which are connected to one another are moved in a direction indicated by arrow 305. In the product carriers 200 there are slaughtered birds 100 or parts thereof, in the case shown in the figure the legs and a chine 102 which is still connected thereto, the birds 100 always being positioned with the same side facing the device 300. The movement of the device 300 is synchronized with the movement of the product carriers 200 along the conveyor 303, specifically in such a manner that one device 1a is always moved towards a bird 100 situated in a product carrier 200 and will therefore be available for each slaughtered bird 100a which is to be processed. In the arrangement shown in the figure, the devices 1 execute a circular movement. However, for the overall device 300 to operate successfully, the type of movement which the devices 1 execute is not restricted to a circular movement. It is important for the devices 1 and the slaughtered birds 100 to be brought together in a suitable way. Therefore, the devices 1 may, for example, also execute a rectilinear movement or a movement along another suitable path.

Preferably, the conveying of the slaughtered birds 100 along the conveyor takes place continuously, in which case the devices 1 move at substantially the same speed as the birds 100 hanging from the product carriers 200. The chine 307 will be removed and collected by the chamber 2 in the manner described above.

Then, the plunger 7 of the rod 6 is displaced, via a rod system 310 mounted in a frame 309, using displacement means which are not shown in more detail, in the chamber 2 in the described way and, at the same time, rotates in the direction of arrow 308. The separation of meat from the chine 307 then takes place in the manner described above and therefore requires no further explanation. The result is a continuously operating device for removing meat from bone parts.

Obviously, the slaughtered birds 100 which are present in the product carriers 200 are not all of the same size. To ensure that precisely that section of the slaughtered birds 100 which is to be processed using the device according to the invention is in fact supplied to this device, it is preferable for the slaughtered birds 100, during conveying along the conveyor 303, to be moved into a suitable position when they enter the active region of the device 300, for example by causing the birds 100 to be turned, tilted, lifted, etc.

For correct operation of the device according to the invention, the transverse dimensions of the chamber 2 closely correspond to the dimensions of the bone parts connected to meat which are to be processed, in particular chines which are connected to meat. The transverse dimensions of the chamber 2 are in this case preferably slightly smaller than the corresponding dimensions of the bone parts connected to meat, so that good filling of the chamber 2 is achieved and the position of the bone parts is accurately defined. However, there is a risk that when the bone parts are introduced into the interior 3 of the chamber 2, a section of the bone parts will remain outside the chamber 2. To ensure that the entire bone part connected to meat is introduced into the chamber 2 at the moment at which the plunger 7 enters the chamber 2, the plunger 7 may be provided with means which press the bone part connected to meat sufficiently far into the chamber 2 before the plunger 7 closes off the chamber 2. Means of this type may be formed, for example, by a moveable pin which is arranged centrally or at another suitable location on the stop surface 8 of the plunger 7. This is diagrammatically illustrated in FIG. 9.

Figure 9:
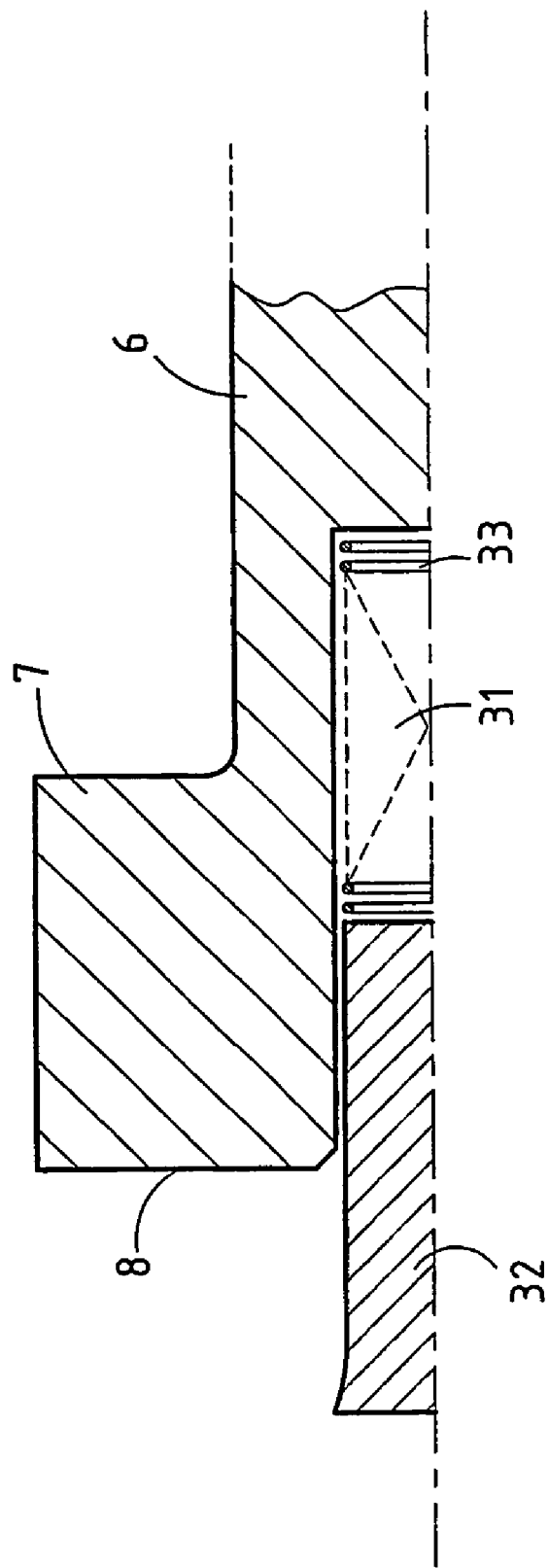
FIG. 9 shows a partial cross-sectional view through a plunger with a moveable pin.

FIG. 9 shows a section of the rod 6 with the plunger 7, the plunger 7, from the stop surface 8, being provided with a centrally arranged bore 31 in which, in the state illustrated in FIG. 9, a cylindrical pin 32 partially extends. In that part of the bore 31 which has been left clear by the pin 32, there is a spring means 33 which, in the compressed state, exerts a compressive force on the pin 32. The spring means 33 may be formed, for example, by a coil spring, a compressible fluid, a compressible plastic or some other suitable spring means.

It is also possible to process small bone parts connected to meat instead of or at the same time as the chines 102. This is shown in FIG. 11.

Figure 11:
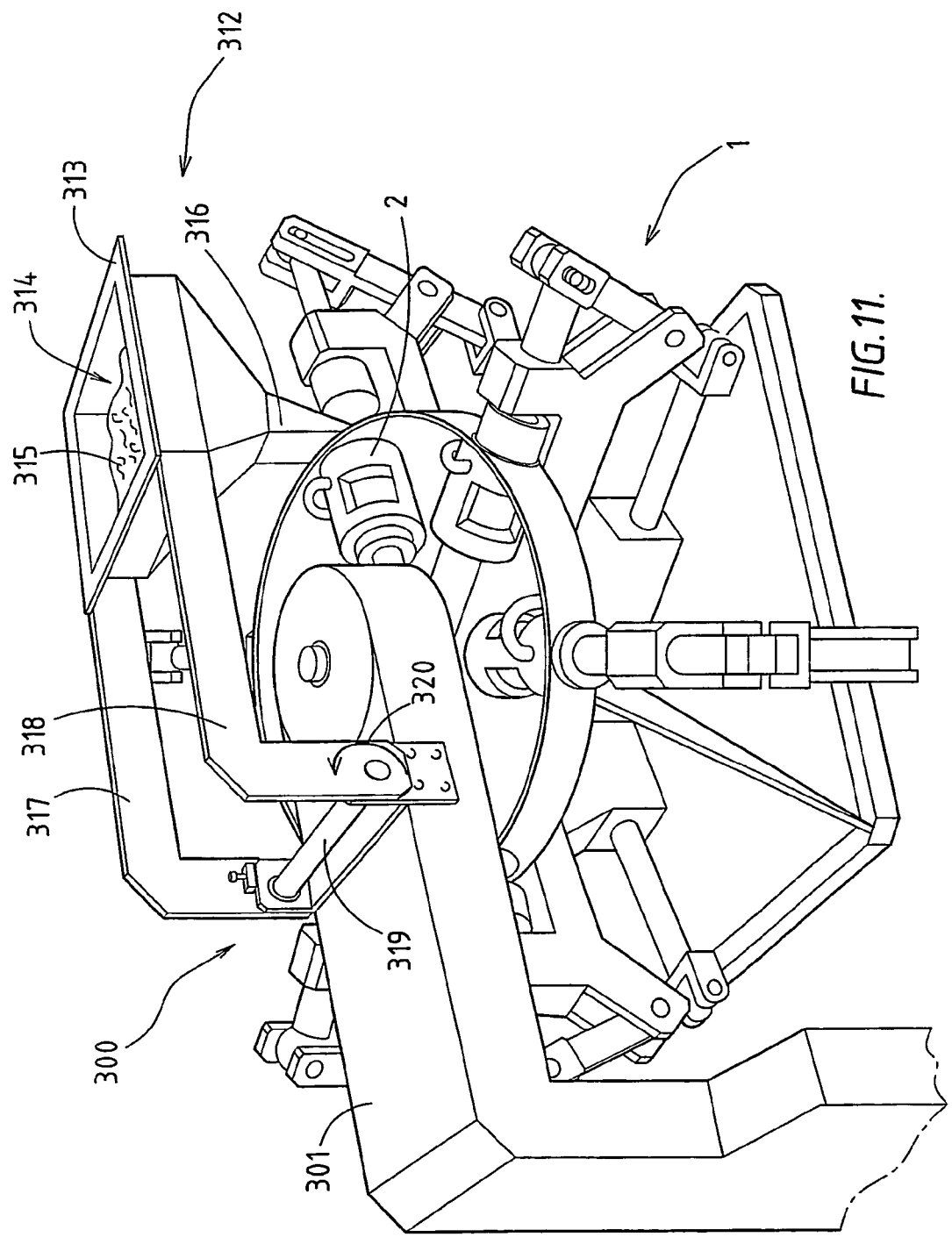
FIG. 11 shows an alternative embodiment of the assembly shown in FIG. 8.

FIG. 11 shows the assembly 300 which interacts with a supply device 312 intended to supply bone parts 315 connected to meat which have been recovered elsewhere, such as necks and the like, to the interior of the devices 1.

The supply device 312 comprises a reservoir 313 with a supply opening 314, via which the reservoir 313 can be filled with the bone parts 315 connected to meat, for example by means of a conveyor belt or by hand, and a hopper 316 for supplying the bone parts 315 out of the reservoir 313 into the interior of the devices 1.

The supply device 312 is pivotably connected to the frame 301 via two support arms 317, 318. In the embodiment of the supply device 312 which is illustrated, the supply device 312 can pivot about a substantially horizontal shaft 319. The supply device 312 can be pivoted upwards by rotating it about the shaft 319 in a direction indicated by arrow 320. In this way, the reservoir 313, in particular the hopper 316, is removed from the region in the vicinity of the chamber 2, and the assembly 300 is able, for example, to interact again with the conveyor 303 from FIG. 8. If the reservoir 313 is pivotably connected to the support arms 317, 318 in such a manner that, during the upward pivoting of the supply device 312, the reservoir 313 continues to maintain a substantially horizontal position, it is possible, for example, for the reservoir 313 to be filled with the bone parts 315 in the pivoted-up position of the supply device 312.

It is also possible to connect the supply device 312 to the frame 301 in such a manner that it can pivot about a substantially vertical axis, so that it is possible, instead of arranging the assembly 300 movably, to allow the supply device 312 to rotate about the shaft 302 (cf. FIG. 8) in order to fill the devices 1 with the bone parts 315 connected to meat.

Figures 10A, 10B:
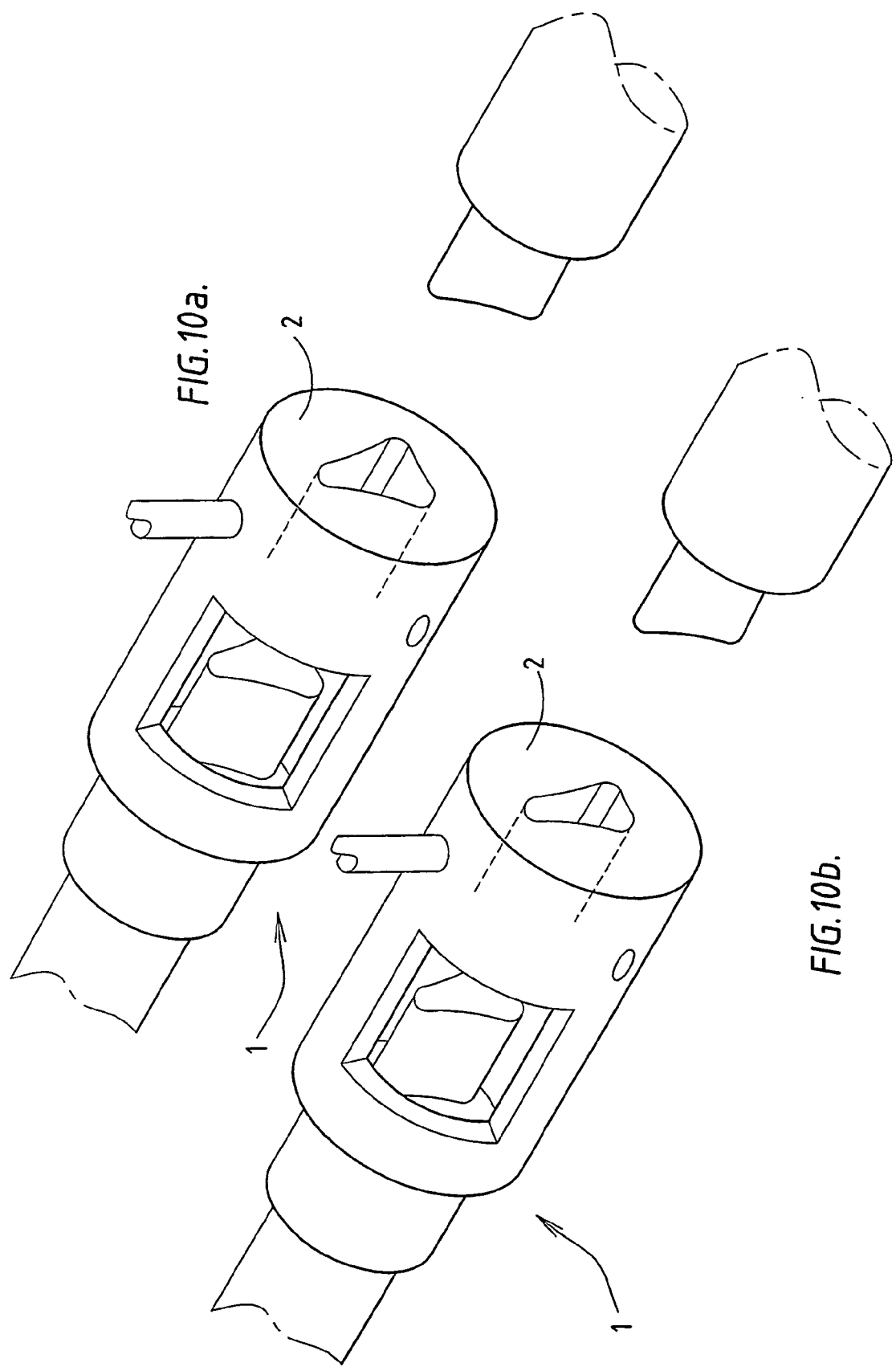
FIG. 10a shows a diagrammatic perspective view of a first alternative embodiment of the device shown in FIG. 1.
FIG. 10b shows a diagrammatic perspective view of a second alternative embodiment of the device shown in FIG. 1.

In the preferred embodiments of devices 1, 300 according to the present invention which have been discussed with reference to the preceding figures, the interior of the chamber 2 always has a substantially circular transverse contour, to which the dimensions of both the plunger 7 and the stop element 13 are matched. However, it may be advantageous for the transverse contour of the interior of the chamber 2 and, accordingly, the transverse contour of the plunger 7 and the stop element 13 to be matched to the shape of the bone parts connected to meat which are to be processed. For example, it is possible for the interior of the chamber 2 to be provided with a substantially triangular transverse contour, with rounded corners. This is shown by means of FIGS. 10*a* and 10*b*; the chamber 2 of the device 1 shown in FIG. 10*a* is suitable for processing, for example, wishbones, and the device 1 shown in FIG. 10*b* is suitable for processing, for example, necks of slaughtered poultry. It will be clear to a person skilled in the art that substantially any desired transverse contour can be used.

Although in the preferred embodiments of the device according to the invention described above measures are taken to prevent bone marrow from contaminating the recovered meat, in practice there is a risk of bone-marrow contamination and/or blood contamination of the recovered meat. As described above, bone-marrow contamination of the meat results in a liver-like flavour and red discoloration of the meat. Blood contamination of the meat likewise results in red discoloration of the meat. Both effects are undesirable an should therefore be avoided. This can be achieved using a downstream device in which any bone-marrow and/or blood contamination of the recovered meat can be eliminated by washing the recovered meat, so that the contaminating bone marrow and blood are removed from the recovered meat.

Figure 12:
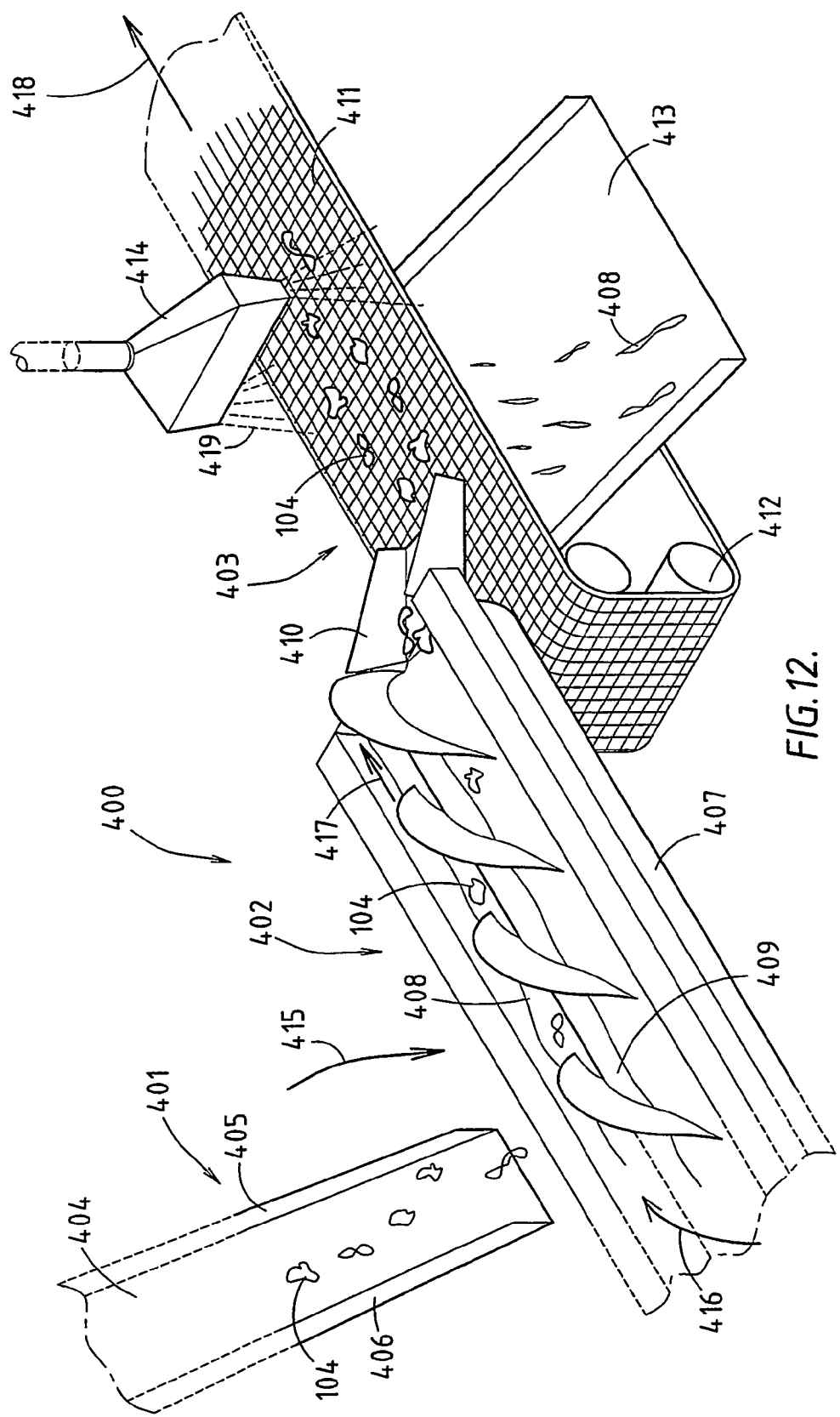
FIG. 12 shows a perspective view of a washing device.

FIG. 12 shows a washing device 400 for meat 104 which is contaminated with bone marrow and/or blood, the washing device 400 being formed by an assembly of a supply chute 401, a washing track 402 and a drying track 403.

The supply chute 401 is formed by a substantially planar plate 404 which is coupled, at an angle to the normal, to a frame (not shown) and is intended to supply the meat 104 to the washing track 402. At the longitudinal edges, the planar plate 404 is provided with two upright edges 405, 406.

The washing track 402 is formed by a substantially elongate channel 407 which is partially filled with a treatment liquid 408 for cleaning the bone-marrow and/or blood-contaminated meat 104. The treatment liquid 408 is for example tap water at a relatively low temperature, for example between 0 C and 10° C. In the channel 407 there is a rotatably driven worm conveyor 409, at least part of which is submerged in the treatment liquid 408 and which is intended to transport the meat 104 which is present in the treatment liquid 408 in the longitudinal direction of the channel 407. The worm conveyor 409 is driven by drive means (not shown in more detail), for example an electric motor or other suitable drive means. The washing track 402 has a discharge end 410 which opens out in the vicinity of the drying track 403, so that the meat 104 is discharged to the drying track 403.

The drying track 403 comprises an endless, driven screen belt 411 which is arranged on a plurality of rollers 412 which are mounted rotatably in a frame (not shown in more detail), only two rollers 412 being illustrated in order to simplify the drawing. The screen belt 411 is formed from a flexible, perforated material in strip form, but may also be formed, for example, by connecting up segments of rigid material which includes a pattern of openings in it. On the underside of the part of the screen belt 411 which lies at the top in the figure, there is a discharge chute 413 which is designed to discharge the treatment liquid 408 which drops off the meat 104 resting on the screen belt 411. Above the top part of the screen belt 411 there is a blower nozzle 414 which is coupled to a frame (likewise not shown in more detail) and is connected to a blower device (not shown in more detail), such as for example a compressed-air installation or a fan.

The meat 104 which is recovered in the manner described in FIGS. 3–7 and, for example, using the devices shown in FIGS. 8 and 11 can be supplied, using a device which is not shown in more detail, to the supply chute 401. Then, the meat 104, under the force of gravity, slides downwards over the planar plate 404 in a direction indicated by arrow 415. At the end of the planar plate 404, the meat 104 drops out of the supply chute 401 and into the channel 407 of the washing track 402, which is partially filled with the treatment liquid 408. In the embodiment of the washing device 400 which is illustrated, the worm conveyor 409 is driven by a drive means (not shown in more detail) in such a manner that the worm conveyor 409 rotates about its longitudinal axis in a direction indicated by arrow 416, with the result that the meat 104 which is present in the treatment liquid 408 will be moved in the direction of arrow 417. During the movement of the meat 104 in the channel 407, it is washed and, through contact with the treatment liquid 408, the bone-marrow and blood contamination will be at least partially removed from the meat 104 as a result of the blood which is present in the meat 104 being dissolved in the treatment liquid 408. Via the discharge end 410, the washed meat 104 is discharged from the channel 407 and is fed to the drying track 403.

The wet meat 104 is placed on the screen belt 411 and is conveyed in a direction indicated by arrow 418. During the conveying of the wet meat 104, some of the treatment liquid 408 adhering to it drips down through the openings in the screen belt 411 and is discharged by means of the discharge chute 413. However, some of the treatment liquid 408 will remain on and in the meat 104 and cannot be removed by simply being left to drip from the meat 104. For this purpose, the meat 104 is dried by means of an airflow 419, which is diagrammatically indicated by dashed lines and is directed onto the meat 104 to be dried via the blowing nozzle 414. The airflow 419 is, for example, ambient air, it being possible for the ambient air to be used firstly to be dried in an upstream drying process, so that the airflow 419 can take up more moisture.

The bone-marrow contamination of the meat 104 has the disadvantageous property of being granular and, moreover, being difficult to dissolve in water, so that the bone marrow sticks to the meat 104 as lumps. Therefore, it is advantageous for the bone marrow which is present on the meat 104 to be rinsed away instead of being washed away, through the use of a spraying device for washing the meat 104.

Figure 13:
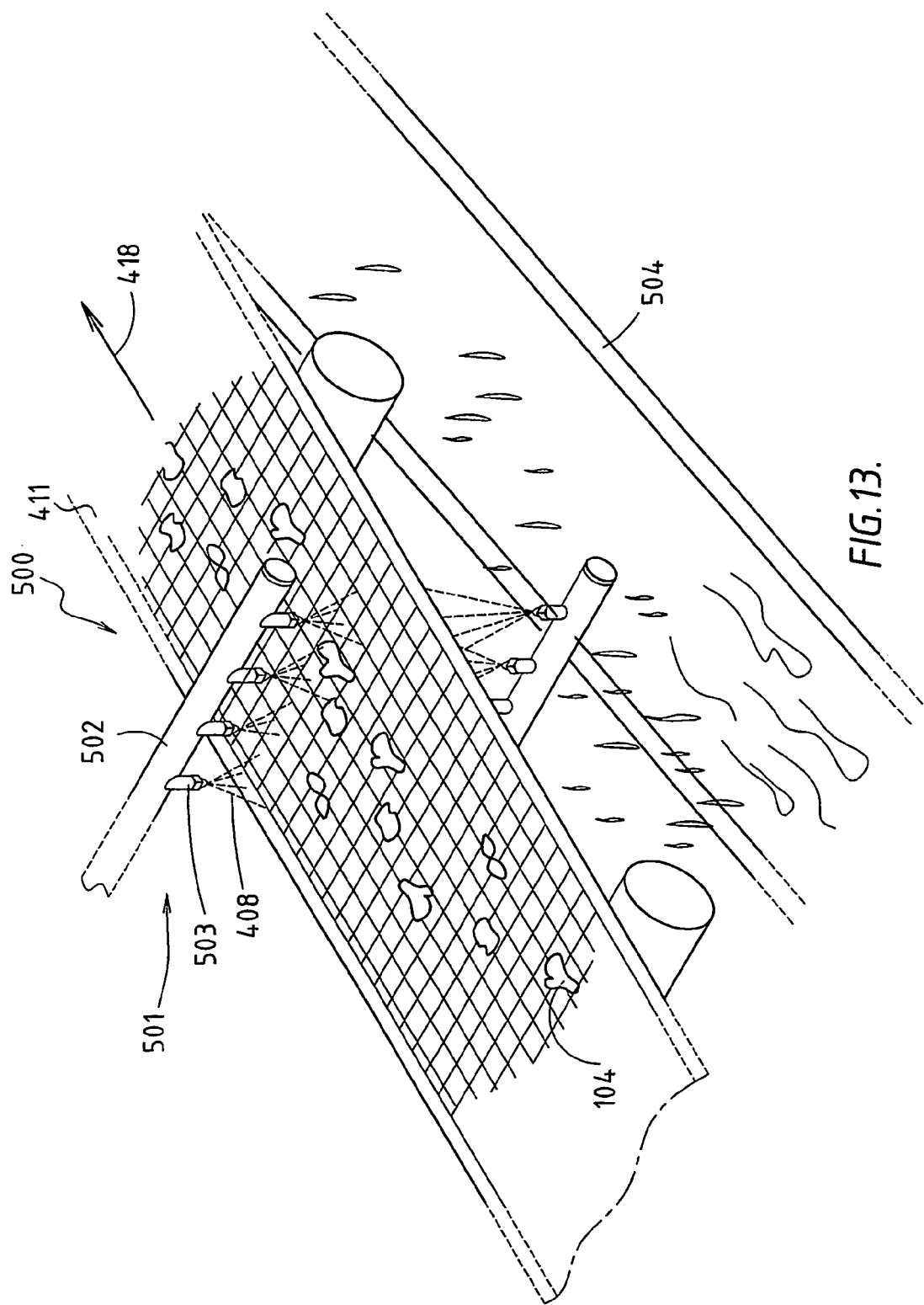
FIG. 13 shows a perspective view of a part of a first alternative embodiment of a washing device.

FIG. 13 shows an alternative washing device 500, in which the washing track 402 from FIG. 12 has been replaced by a spraying station 501. In the preferred embodiment shown, the spraying station 501 is of duplicate design and comprises, both on the underside and the top side of the top part of the screen belt 411 (only part of which is illustrated), a supply pipe 502, in each case with three spray nozzles 503. The meat 104 lying on the screen belt 411 is conveyed in the direction of the arrow 418 in the manner described with reference to FIG. 12, and is therefore conveyed past the spraying station 501. As a result, the treatment liquid 408 is sprayed onto the meat 104 both from the top side and from the underside. Spraying instead of immersing the meat 104 has the effect of more successfully rinsing bone marrow present on the meat 104 off the meat 104. The blood which is present on the meat 104 is also dissolved. The used treatment liquid is discharged via a discharge chute 504.

During the washing and drying of the meat 104, it is expedient if its entire surface comes into contact with, firstly, the treatment liquid 408 and, secondly, the airflow 419. To achieve this, the meat 104, while it is being conveyed, can be displaced with respect to the base along which it is being conveyed, for example by making the screen belt vibrate using means which are not shown in more detail.

Figure 14:
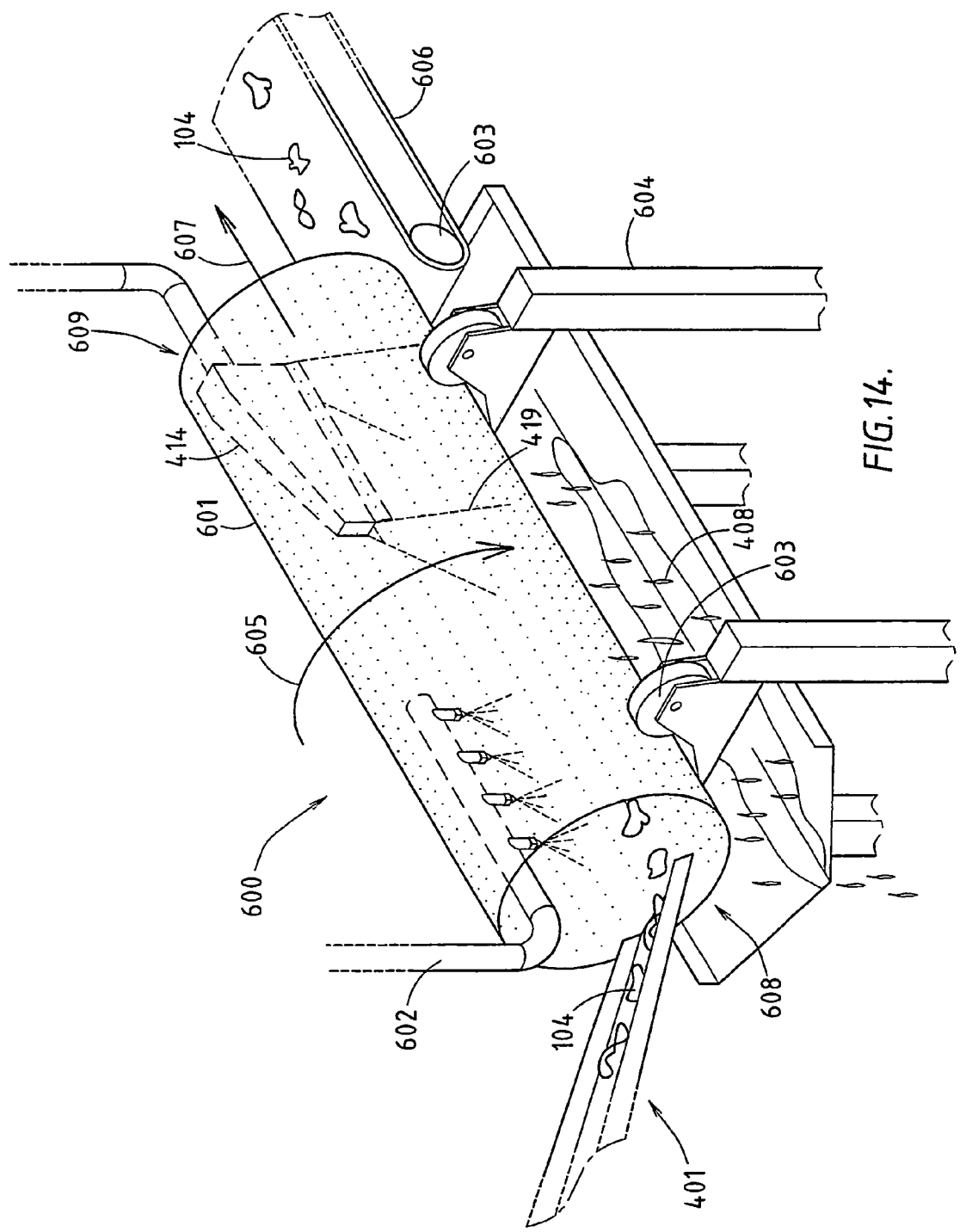
FIG. 14 shows a perspective view of a second alternative embodiment of a washing device.

FIG. 14 shows a washing device 600 in which the washing and/or spraying and the drying of the meat 104 takes place in a rotatably driven drum 601 with a supply end 608 and a discharge end 609, the drum 601, like the screen belt 411, being provided with a perforation for discharging the treatment liquid 408.

In the vicinity of the supply end 608 and the discharge end 609, the rotatably driven drum 601 rests on support wheels 603, which support wheels 603 are rotatably mounted on a diagrammatically illustrated frame 604, and at least one support wheel 603 being driveable by means of drive means (not shown in more detail).

The meat 104 is supplied to the drum 601 via the supply chute 401. In the interior of the drum 601 there is one spraying station 502 which, via the spray nozzles 503, sprays the treatment liquid 408 onto the meat 104, although there may also be a plurality of these spraying stations, in which case, for example, one spraying station is arranged on the outside of the drum 601. In the preferred embodiment of the washing device 600 illustrated, the drum 601 rotates about its longitudinal axis in a direction indicated by arrow 605, and the meat 104 which is present on the inner surface of the drum 601 will be carried along over part of the rotational movement of the drum 601 and will then drop back to the lowest point in the drum 601. The result is that the meat 104, while it is being conveyed towards the discharge end 609, is displaced with respect to the base, with the result that the entire surface of the meat 104 will come into contact with the treatment liquid 408. In a similar way, the entire surface of the meat 104 will come into contact with the airflow 419 on passing the blowing nozzle 414. After the meat 104 has been washed and dried, it is removed from the drum 601 and is discharged via a conveyor track 606 in the direction of arrow 607. To simplify the displacement of the meat 104 over the inner surface of the drum 601 from the supply end 608 towards the discharge end 609, the drum 601 is at a higher level at the supply end 608 than at the discharge end 609.

Figure 15:
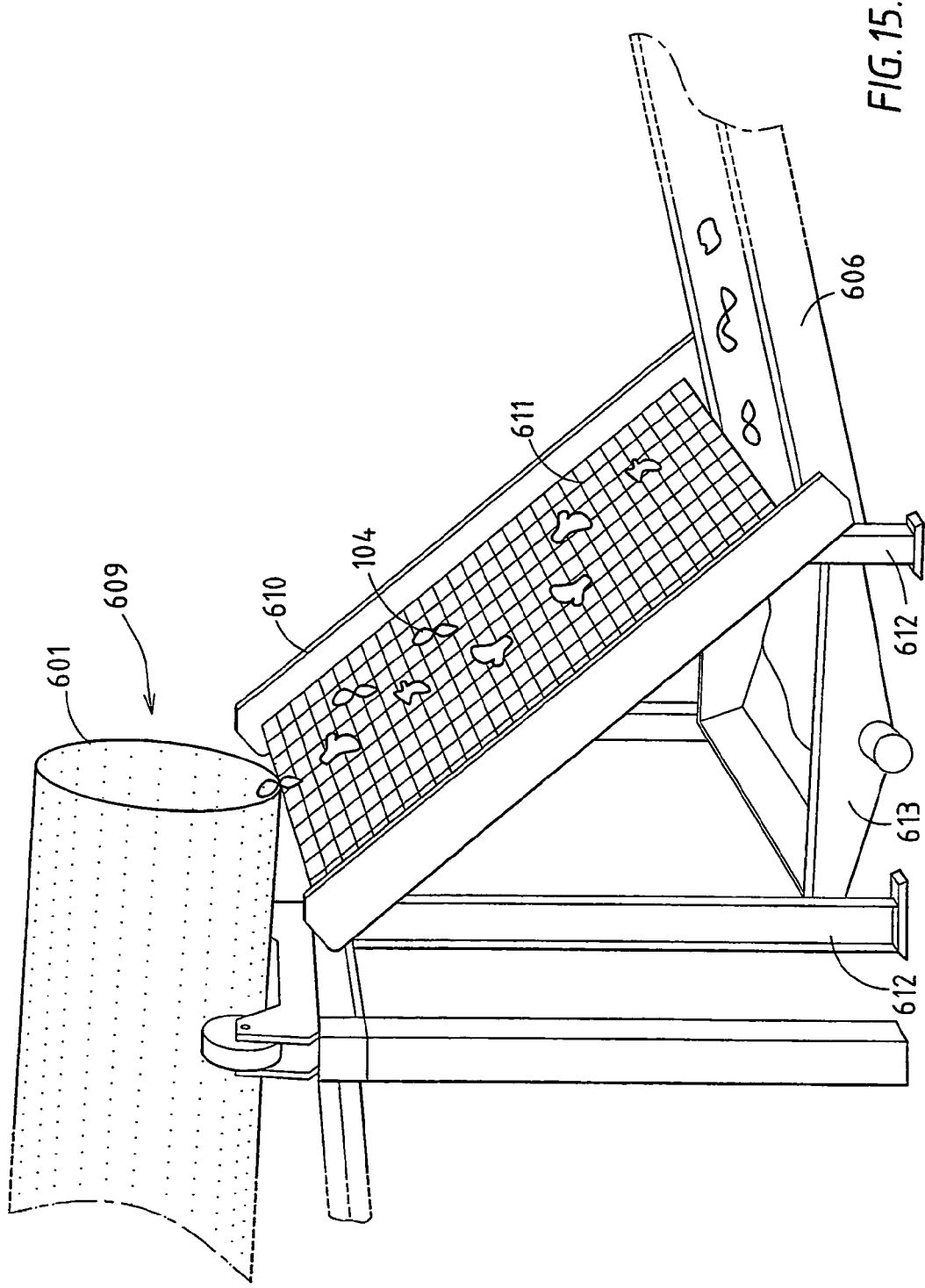
FIG. 15 shows a perspective view of a part of a third alternative embodiment of a washing device.

It is also possible for the meat 104 which is to be discharged from the drum 601 not to be dried with the aid of an airflow, but rather for the meat 104 simply to be allowed to drip dry. This is shown in FIG. 15.

At the discharge end 609 of the drum 601 (only part of which is illustrated), there is an inclined drip chute 610, which is formed by a substantially planar, perforated plate 611 which is arranged on uprights 612. The meat 104 is placed onto the drip chute 610 via the discharge end 609, and the meat 104 will move along the surface of the perforated plate 611 towards the diagrammatically illustrated conveyor track 606 under the force of gravity. Depending on the angle of inclination of the perforated plate 611, i.e. the angle which the perforated plate 611 forms with the normal, the meat 104 will then move, either by sliding or tumbling, over the surface of the perforated plate 611. During the movement of the meat 104, the treatment liquid 408 adhering to it will drip through the perforated plate 611 in drops and will be collected by a discharge vessel 613.

To improve the movement of the meat 104 over the surface of the perforated plate 611 in the direction of the conveyor track 606 and, at the same time, the removal of the treatment liquid 408 adhering to the meat residues 104, it is possible for the drip chute 610 to be vibrated or gently shaken with the aid of means which are known per se and are not shown in more detail.

The treatment liquid 408 may be provided with auxiliary substances, such as for example means which reduce the pH, such as lactic acid, or means for blanching the meat 104.

Moreover, it is possible to use a relatively high temperature of the treatment liquid 408 instead of a low temperature, so that a preliminary treatment, for example blanching, is carried out on the meat 104.

It will be clear to a person skilled in the art that the scope of the present invention is not restricted to the embodiments described above, but rather various amendments and modifications to these embodiments are possible without departing from the scope of the invention as defined in the appended claims.

In the above text, the stop element is always held at a fixed distance from the chamber while pressure is being applied to the bone parts connected to meat, with the result that during the pressing action the gap is always fixed. However, it is also possible for the size of the gap to be changed at various stages of the pressing action.

For example, it is also possible for the device in which a plurality of devices according to the invention are fitted on a rotatably driven support to be used not only in the horizontal arrangement shown in the figures, but also at any desired angle with respect to the horizontal.

The invention claimed is:

1. A device for separating meat from bone parts, in particular for separating meat from bone parts of poultry, comprising:
   a. a chamber for receiving the meat with bone parts comprising a first open end and a second open end opposite the first open end;
   b. a plunger;
   c. displacement means for displacing the plunger with respect to the chamber; and
   d. a stop element comprising a first end,
wherein the chamber, plunger and stop element define a space in which the meat wit bone parts is positioned and wherein the second open end of the chamber and the first end of the stop element form, when the stop element is in a first position, at least one elongate gap trough which meat separated from the bone parts can escape from the space.

2. The device of claim 1, further comprising means for mechanically locking the stop element in the first position.

3. The device of claim 1, wherein the stop element is moveable into a second position wherein the stop element is situated at least partially in the chamber.

4. The device of claim 1, wherein the first end of the stop element comprises cutting means for severing connections between the meat and the bone parts.

5. The device of claim 1, further comprising a discharge means provided in the stop element for discharging bone marrow which emerges from the bone parts when the bone parts in the space are subjected to pressure.

6. The device of claim 5, wherein the discharge means is coupled to suction means.

7. The device of claim 1, further comprising a discharge means provided in the chamber for discharging bone marrow which emerges from the bone parts when the bone parts in the space are subjected to pressure.

8. The device of claim 7, wherein the discharge means is coupled to suction means.

9. The device of claim 1, wherein the elongate gap formed between the chamber and the stop element comprises a width that is fixed when pressure is applied to the meat with bone parts in the space.

10. The device of claim 1, wherein the elongate gap formed between the chamber and the stop element comprises a width that varies when pressure is applied to the meat wit bone parts m the space.

11. The device of claim 1, wherein to plunger comprises a stop face having a contoured surface.

12. The device of claim 1, wherein the plunger comprises cutting means for cutting the meat with bone parts.

13. The device of claim 1, wherein the stop element comprises a layer of flexible covering material at its first end.

14. The device of claim 1, further comprising control means for controlling the displacement of the plunger in the chamber, wherein the control means controls the displacement of the plunger in the chamber on the basis of at least one of: (1) the location of flue plunger in the chamber; (2) the velocity of the plunger in the chamber; and (3) the time which has elapsed daring the displacement.

15. An assembly for processing slaughtered animals or parts thereof comprising the device of claim 1 arranged on at least one moveable carrier.

16. The assembly of claim 15, wherein the assembly interacts with a conveyor for supplying slaughtered birds to the device.

17. The assembly of claim 15, further comprising supply means far supplying meat wit bone parts to the device, wherein the supply means comprises a reservoir for retaining the meat with bone parts and a hopper through which the meat with bone parts is delivered from the reservoir and at least partially into the chamber.

18. The assembly of claim 15, further comprising cleaning means for cleaning meat which has been separated from bone parts, wherein the cleaning means supplies treatment liquid to the separated meat for removing blood and bone-marrow from the separated meat.

19. The assembly of claim 18, further comprising a drying device for removing excess treatment liquid from the separated meat.

20. The assembly of claim 19, further comprising a drum through which the separated meat travels to encounter the drying device.

21. The assembly of claim 20, wherein the drum comprises at least one wall having perforations.

* * * * *